US010304336B2

(12) United States Patent
Bohler et al.

(10) Patent No.: US 10,304,336 B2
(45) Date of Patent: May 28, 2019

(54) TETHERING INDICATOR FIXTURES TO ILLUMINATION FIXTURES

(71) Applicant: Eaton Intelligent Power Limited, Dublin (IE)

(72) Inventors: Christopher Lee Bohler, Peachtree City, GA (US); Kenneth Dale Walma, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/908,528

(22) Filed: Feb. 28, 2018

(65) Prior Publication Data

US 2018/0253971 A1 Sep. 6, 2018

Related U.S. Application Data

(60) Provisional application No. 62/465,561, filed on Mar. 1, 2017.

(51) Int. Cl.

| | |
|---|---|
| ***G08B 5/36*** | (2006.01) |
| ***B60Q 1/48*** | (2006.01) |
| ***G08G 1/14*** | (2006.01) |

(52) U.S. Cl.

CPC ............... *G08G 1/142* (2013.01); *G08B 5/36* (2013.01)

(58) Field of Classification Search

None

See application file for complete search history.

(56) References Cited

U.S. PATENT DOCUMENTS

| | | | | |
|---|---|---|---|---|
| 6,124,808 A * | 9/2000 | Budnovitch | ............ | B60Q 1/48 340/691.1 |
| 6,771,185 B1 * | 8/2004 | Yoo | .................... | G06Q 30/0284 340/525 |
| 2008/0094832 A1 * | 4/2008 | Altamura | .................. | A47F 7/00 362/240 |

* cited by examiner

*Primary Examiner* — John F Mortell

(74) *Attorney, Agent, or Firm* — King & Spalding LLP

(57) ABSTRACT

A parking facility illumination and space indicator system includes a lighting fixture configured to emit an illumination light to illuminate a parking facility and an indicator fixture coupled to the lighting fixture by a first electrical cable. The indicator fixture is configured to indicate availability of one or more parking spaces in the parking facility. The system further includes a sensor coupled to the lighting fixture by a second electrical cable. The sensor is configured to sense availability of the one or more parking spaces for parking. The lighting fixture is configured to provide power to the indicator fixture over the first electrical cable and to the sensor over the second electrical cable. The indicator fixture indicates the availability of the one or more parking spaces based on space availability information from the sensor.

20 Claims, 5 Drawing Sheets

TETHERING INDICATOR FIXTURES TO ILLUMINATION FIXTURES

CROSS REFERENCE TO RELATED APPLICATIONS

The present application claims priority under 35 U.S.C. Section 119(e) to U.S. Provisional Patent Application No. 62/465,561, filed Mar. 1, 2017, and titled "Tethering Indicator Fixtures To Illumination Fixtures," the entire content of which is incorporated herein by reference.

TECHNICAL FIELD

The present disclosure relates generally to lighting solutions, and more particularly to indicator fixtures tethered to lighting fixtures.

BACKGROUND

Many parking garages use indicator fixtures to indicate parking space availability. Parking garage space availability indicator systems are typically powered independently from parking garage lighting fixtures that are provided for illumination of parking garages. Adding a separate power infrastructure to a parking garage for space indicator fixtures may be expensive and/or structurally challenging. Thus, using the power infrastructure of the illumination lighting system of parking garages to power indicator fixtures may be desirable.

SUMMARY

The present disclosure relates generally to lighting solutions, and more particularly to indicator fixtures tethered to lighting fixtures. In an example embodiment, a parking facility illumination and space indicator system includes a lighting fixture configured to emit an illumination light to illuminate a parking facility and an indicator fixture coupled to the lighting fixture by a first electrical cable. The indicator fixture is configured to indicate availability of one or more parking spaces in the parking facility. The system further includes a sensor coupled to the lighting fixture by a second electrical cable. The sensor is configured to sense availability of the one or more parking spaces for parking. The lighting fixture is configured to provide power to the indicator fixture over the first electrical cable and to the sensor over the second electrical cable. The indicator fixture indicates the availability of the one or more parking spaces based on space availability information from the sensor.

In another example embodiment, a parking facility illumination and space indicator system includes a lighting fixture configured to emit a light to illuminate a parking facility, where the lighting fixture includes a sensor configured to sense availability of one or more parking spaces. The system further includes an indicator fixture to indicate the availability of the one or more parking spaces in the parking garage based on space availability information from the sensor. The indicator fixture is coupled to the lighting fixture by an electrical cable, where the lighting fixture provides power to the indicator fixture over the electrical cable.

In another example embodiment, a parking facility illumination and space indicator system includes a lighting fixture configured to emit a light to illuminate a parking facility and an indicator fixture including a sensor configured to sense availability of one or more parking spaces. The indicator fixture is configured to indicate the availability of the one or more parking spaces based on space availability information from the sensor. The indicator fixture is coupled to the lighting fixture by an electrical cable, and the lighting fixture provides power to the indicator fixture over the electrical cable.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein.

Figure 1:
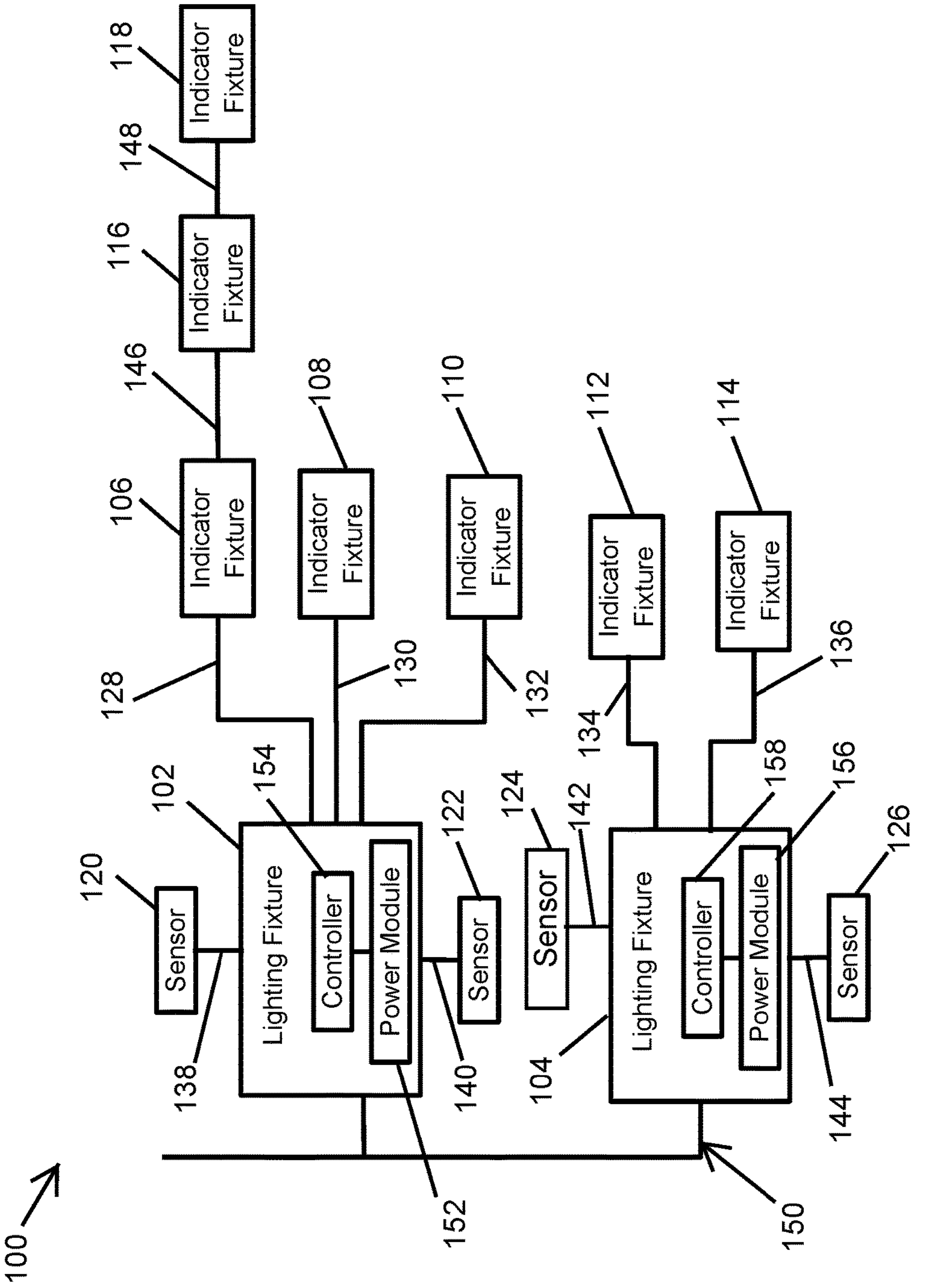
FIG. 1 is a system of parking space indicator fixtures tethered to illumination lighting fixtures according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals used in different drawings designate like or corresponding, but not necessarily identical, elements.

DETAILED DESCRIPTION OF EXAMPLE EMBODIMENTS

The present disclosure relates generally to indicator fixtures that are tethered to lighting fixtures. In particular, indicator fixtures that are used to indicate parking space availability in a parking facility, such as a parking garage or lot, can be tethered to lighting fixtures that are used for illumination of the parking garage or lot. Using a distributed low voltage power (DLVP) backbone, power over Ethernet (PoE) or other cabled approaches, indicator fixtures that are used for indicating parking space availability can be tied into the existing lighting infrastructure and can leverage the communication and controls features built into the existing lighting fixtures and lighting system. For example, indicator fixtures may be installed on a per-parking-spot basis or may be zoned such that an indicator fixture is used to indicate availability of one of several (e.g., two or eight) parking spaces.

The availability of parking spaces may be sensed by sensors that can also be tethered to the lighting fixtures. For example, sensors may be distributed in a parking garage or lot in a manner that matches the distribution of the indicator fixtures, where an indicator light operates in conjunction with a respective sensor. Multiple sensors may be associated with a single indicator fixture, or multiple indicator fixtures may be associated with a single sensor. Each indicator fixture may be Class 2 fixture that requires less than 5 watts, eliminating the need for wiring a conduit for the short runs between the indicator fixtures and the lighting fixtures.

Turning to the drawings, FIG. 1 is a system 100 of parking space indicator fixtures tethered to illumination lighting fixtures according to an example embodiment. In some example embodiments, the system 100 may be deployed in a parking garage or a parking lot. As illustrated in FIG. 1, the system 100 may include a first lighting fixture 102 and a second lighting fixture 104. For example, the lighting fixtures 102, 104 may be light emitting diode (LED) lighting fixtures. The lighting fixtures 102, 104 may emit lights to illuminate the parking garage. For example, the lighting fixture 102 may emit a light to illuminate primarily an area of a parking garage that includes a number of parking spaces, and the lighting fixture 104 may emit a light to illuminate primarily another area of the parking garage that includes a number of other parking spaces.

As illustrated in FIG. 1, the system 100 may also include indicator fixtures 106, 108, 110 that are connected to the lighting fixture 102. The indicator fixture 106 is connected to the lighting fixture 102 by an electrical cable 128, the indicator fixture 108 is connected to the lighting fixture 102 by an electrical cable 130, and the indicator fixture 110 is connected to the lighting fixture 102 by an electrical cable 132. The lighting fixture 102 may provide power to the indicator fixtures 106, 108, 110 over the respective electrical cables 128, 130, 132. The lighting fixture 102 may also communicate with the indicator fixtures 106, 108, 110 over the respective electrical cables 128, 130, 132. Alternatively or in addition, the lighting fixture 102 may communicate with the indicator fixtures 106, 108, 110 wirelessly.

In some example embodiments, the system 100 may also include indicator fixtures 112, 114 that are coupled to the lighting fixture 104. The indicator fixture 112 is connected to the lighting fixture 104 by an electrical cable 134, and the indicator fixture 114 is connected to the lighting fixture 104 by an electrical cable 136. The lighting fixture 104 may provide power to the indicator fixtures 112, 114 over the respective electrical cables 134, 136. The lighting fixture 104 may also communicate with the indicator fixtures 112, 114 over the respective electrical cables 134, 136. Alternatively or in addition, the lighting fixture 104 may communicate with the indicator fixtures 112, 114 wirelessly.

The system 100 may further include indicator fixtures 116, 118 that are daisy chained with the indicator fixture 106. For example, the indicator fixture 116 may be coupled to the indicator fixture 106 by an electrical cable 146, and the indicator fixture 118 may be coupled to the indicator fixture 116 by an electrical cable 148. The lighting fixture 102 may provide power and communicate with the indicator fixtures 116, 118 over the cables 128, 146, 148. Alternatively or in addition, the lighting fixture 102 may communicate with the indicator fixtures 116, 118 wirelessly.

In some example embodiments, each indicator fixture 106, 108, 110, 112, 114, 116, 118, may include an LED light source that emits a light. The LED light source may include one or more discrete light emitting diodes (LEDs), one or more organic LEDs (OLEDs), an LED chip on board that includes one or more discrete LEDs, and/or an array of discrete LEDs. In some alternative embodiments, the indicator fixture may include another type of light source without departing from the scope of this disclosure.

In some example embodiments, the indicator fixtures may emit different color lights to indicate availability and unavailability of parking spaces associated with the indicator fixtures 106, 108, 110, 112, 114, 116, 118. For example, the indicator fixture 106 may emit a green light to indicate that one or more parking spaces associated with the indicator fixture 106 are available (i.e., open), and the indicator fixture 106 may emit a red light to indicate that no parking space associated with the indicator fixture 106 is available. Alternatively or in addition, each indicator fixture may blink its lights, display a text or a number, or otherwise indicate the availability and unavailability of one or more parking spaces associated with the indicator fixture by means of the light emitted by the indicator fixture.

As illustrated in FIG. 1, the system 100 may include sensors 120, 122, 124, 126. The sensor 120 is coupled to the lighting fixture 102 by an electrical cable 138, and the sensor 122 is coupled to the lighting fixture 102 by an electrical cable 140. The sensor 124 is coupled to the lighting fixture 104 by an electrical cable 142, and the sensor 126 is coupled to the lighting fixture 104 by an electrical cable 144. Each sensor 120, 122, 124, 126 may be located in a parking garage to sense availability of one or more parking spaces associated with the particular sensor. The sensors 120, 122, 124, 126 may each include a camera, a motion sensor, an RFID reader, a magnetic sensor, and/or another type of sensor that may be used to sense availability of one or more parking spaces.

To illustrate, the sensors 120, 122, 124, 126 may each include a camera that can perform a pixel analysis to determine whether one or more parking spaces are occupied. Each sensor 120, 122, 124, 126 may communicate the result of the pixel analysis (e.g., whether and how parking spaces are available) to the respective lighting fixtures 102, 104, which may provide the information (or a related command) to the respective one or more indicator fixtures 106-118. Alternatively, the sensors 120, 122, 124, 126 may provide the result of the pixel analysis or an appropriate command to the respective one or more indicator fixtures 106-118 without passing the information through the lighting fixtures 102, 104.

In some example embodiments, the lighting fixtures 102 may perform pixel analysis after receiving information, such as one or more images, from one or both sensors 120, 122 to determine whether one or more parking spaces are occupied or available. The lighting fixtures 104 may also perform pixel analysis after receiving information, such as one or more images, from one or both sensors 124, 126 to determine whether one or more parking spaces are occupied or available.

In some alternative embodiments, a remote device that receives sensor information, such as one or more images, from one or both sensors 120, 122, 124, 126 may perform pixel analysis to determine whether one or more parking spaces are occupied or available. The remote device may receive the sensor information from the sensors 120, 122, 124, 126 through the respective lighting fixtures 102, 104, directly from the sensors 120, 122, 124, 126, or through another device such as a network router and/or gateway.

In some example embodiments, one or more of the sensors 120, 122, 124, 126 may include an RFID reader. RFID tags may be placed/installed in parking spaces such that a vehicle that is parked in a parking space blocks and prevents reading of the respective RFID tag by the respective RFID reader (i.e., one of the sensors 120, 122, 124, 126). When parking spaces associated with the sensors 120, 122, 124, 126 are available (i.e., unblocked by parked vehicles), the sensors 120, 122, 124, 126 can successfully read respective RFID tags. To illustrate with respect to the sensor 120 and a particular parking space, an RFID tag may be placed/installed in the particular parking space such that a car that is parked in the parking space prevents the sensor 120 (i.e., the RFID reader) from reading the RFID tag. When the particular parking space is unoccupied, the sensor 120 can successfully read the RFID tag.

Each sensor 120, 122, 124, 126 may determine whether a respective one or more parking spaces are available based on whether the particular sensor 120, 122, 124, 126 can read the respective one or more RFID tags. Alternatively or in addition, each sensor 120, 122, 124, 126 may provide sensor information to the respective lighting fixture 102, 104 indicating whether the sensors 120, 122, 124, 126 are able to read the respective one or more RFID tags. The lighting fixture 102, 104 may provide the received information or an appropriate command to the respective one or more indicator fixtures 106-118. Alternatively, the sensors 120, 122, 124, 126 may provide the result of the sensor information or an appropriate command to the respective one or more indicator fixtures 106-118 without passing the information through the lighting fixtures 102, 104.

In some example embodiments, one or more of the sensors 120, 122, 124, 126 may include a magnetic sensor that is used in a similar manner as described with RFID readers. For example, magnets may be placed or installed in parking spaces such that parked cars would interfere with the magnetic fields sensed by the sensors 120, 122, 124, 126 with respect to respective parking spaces. The information can be provided to the lighting fixtures 102, 104 or to the indicator fixtures 106-118 in a similar manner as described above.

In some example embodiments, the lighting fixture 102 may provide power to with the sensors 120, 122 over the cables 138, 140, and the lighting fixture 104 may provide power to the sensors 124, 126 over the cables 142, 144. The lighting fixture 102 may also communicate with the sensors 120, 122 over the cables 138, 140, and the lighting fixture 104 may also communicate with the sensors 124, 126 over the cables 142, 144. Alternatively or in addition, the lighting fixture 102 may communicate with the sensors 120, 122 wirelessly, and the lighting fixture 104 may communicate with the sensors 124, 126 wirelessly. To illustrate, the sensors 120, 122 may communicate space availability information to the lighting fixture 102 via the respective electrical cable 138, 140 or wirelessly, and the sensors 124, 126 may communicate space availability information to the lighting fixture 104 via the respective electrical cable 142, 144 or wirelessly.

The electrical cables used to electrically couple the lighting fixtures 102, 104, the indicator fixtures 106-118, and the sensors 120-126 may be Ethernet cables (e.g., CAT 5, CAT 5e, CAT 6) or another type of cable that can be used to provide power from the lighting fixtures 102, 104 to the indicator fixtures 106-118 and the sensors 120-126. As described above, the electrical cables 138, 140, 142, 144 may also be used for communication between the lighting fixtures 102, 104, the indicator fixtures 106-118, and the sensors 120-126.

In some example embodiments, the lighting fixture 102 includes a power module 152 and a controller 154. The power module 152 may include an AC/DC converter to convert AC power to DC power that can be provided to the indicator fixtures 106, 108, 110, 116, 118, and the sensors 120, 122. In some example embodiments, the power module 152 may be the driver of the lighting fixture 102 that also provides power to the LED light sources of the lighting fixture 102. The power module 152 may receive AC power (e.g., at 120 VAC) from a power mains or other AC power supply (e.g., a generator) via an electrical connection 150 and may generate DC power (e.g., less than 60 VDC, approximately 60 VDC, and/or more than 60 VDC, etc.) that is provided to the indicator fixtures 106, 108, 110, 116, 118, and the sensors 120, 122 via the respective electrical cables 128, 130, 132, 146, 148, 138, 140. In some alternative embodiments, the power module 152 may receive input DC power via the connection 150 and may generate output DC power that is provided to the indicator fixtures 106, 108, 110, 116, 118, and the sensors 120, 122. For example, the input DC power may be provided by a battery or another DC power source, and the power module 152 may include a DC/DC converter that generates the output DC power. In some example embodiments, the power module 152 may be a Class 2 power source.

In some example embodiments, the controller 154 (e.g., a microcontroller or a microprocessor that can execute a software code) of the lighting fixture 102 may control the indicator fixtures 106, 108, 110, 116, 118 based on space availability information received from the sensors 120, 122. For example, the controller 154 may receive space availability information from the sensor 120 via the electrical cable 138 or wirelessly and control the color of the light emitted by the indicator fixture 106 based on the information by sending the information or a control command to the indicator fixture 106 via the electrical cable 128. Alternatively or in addition, the controller 154 may control the indicator fixture 106 to blink the light emitted by the indicator fixture 106 based on the space availability information. The controller 154 may also control the indicator fixture 106 to display the number of available parking spaces. In some example embodiments, the controller 154 may control the other indicator fixtures 108, 110, 116, 118 in a similar manner as described with respect to the indicator fixture 106. The controller 154 may also control overall operations of the indicator fixtures 106, 108, 110, 116, 118 including the powering on and off the indicator fixtures 106, 108, 110, 116, 118. The controller 154 may also control overall operations of the sensors 120-126 including the powering on and off the sensors 120-126. The lighting fixture 102 may communicate with the indicator fixtures 106, 108, 110, 116, 118 via the respective electrical cables or wirelessly to control the operations of the indicator fixtures 106, 108, 110, 116, 118.

In some example embodiments, the lighting fixture 104 includes a power module 156 and a controller 158. The power module 156 may operate in a similar manner as the power module 152 to provide power to the indicator fixtures 112, 114, and the sensors 124, 126. For example, the power module 156 may receive AC power (e.g., at 120 VAC) from the power mains or another AC power supply (e.g., a generator) via the electrical connection 150 and may generate DC power (e.g., less than 60 VDC, approximately 60 VDC, and/or more than 60 VDC, etc.) that is provided to the indicator fixtures 112, 114, and the sensors 124, 126 via the respective electrical cables 134, 136, 142, 144. In some alternative embodiments, the power module 156 may receive input DC power via the connection 150 and may generate output DC power that is provided to the indicator fixtures 112, 114 and the sensors 124, 126. For example, the input DC power may be provided by a battery or another DC power source, and the power module 156 may include a DC/DC converter that generates the output DC power.

In some example embodiments, the controller 158 may operate in a similar manner as the controller 154 to control operations of the indicator lights 112, 114. For example, the controller 158 may control operations of the indicator fixture 112 based on space availability information from the sensor 124 received wirelessly or via the cable 142. As another example, the controller 158 may control operations of the indicator fixture 114 based on space availability information from the sensor 126 received wirelessly or via the cable 144. To control the operation of the indicator fixtures 112, 114 by the controller 158 as described above, the lighting fixture 104 may communicate with the indicator fixtures 112, 114 via the respective electrical cables or wirelessly. In general, the controllers 154, 156 may execute respective software codes to perform some of the operations described herein with respect to the lighting fixtures 102, 104.

In some example embodiments, wired and/or wireless communication infrastructure of the lighting fixtures 102, 104 may be used to remotely control operations of the indicator fixtures 106-118 and/or the sensors 120-126. For example, the communication infrastructure that is used to control operations of the lighting fixtures 102, 104 may be used to configure, control, etc. operations of the indicator fixtures 106-118 and the sensors 120-126, for example, through the lighting fixtures 102, 104 or independent of the lighting fixtures 102, 104. To illustrate, a person may use a local or remote management device (e.g., a laptop) to communicate with and control operations of the indicator fixtures 106-118 and the sensors 120-126 using the communication infrastructure used to manage the lighting fixtures 102, 104. By using the control, power and/or communication infrastructures of the illumination light system of a parking garage or lot, cost and structural challenges associated with separate power and communication infrastructures for an indicator fixtures system may be reduced or avoided.

Although a configuration of lighting fixtures, indicator fixtures, and sensors are shown in FIG. 1, the system 100 may have other configurations without departing from the scope of this disclosure. Further, although particular numbers of lighting fixtures, indicator fixtures, and sensors are shown in FIG. 1, the system 100 may include fewer or more system elements than shown without departing from the scope of this disclosure. For example, the system 100 may include fewer or more than two lighting fixtures. As another example, fewer or more indicator fixtures and sensors than shown may be coupled to the each lighting fixture. In some example embodiments, the power module of each lighting fixture may be the LED driver of the lighting fixture or may be integrated with the LED driver of the lighting fixture. In some example embodiments, the controller of each lighting fixture may control other operations of the lighting fixture as well as the respective indicator fixtures.

Figure 2:
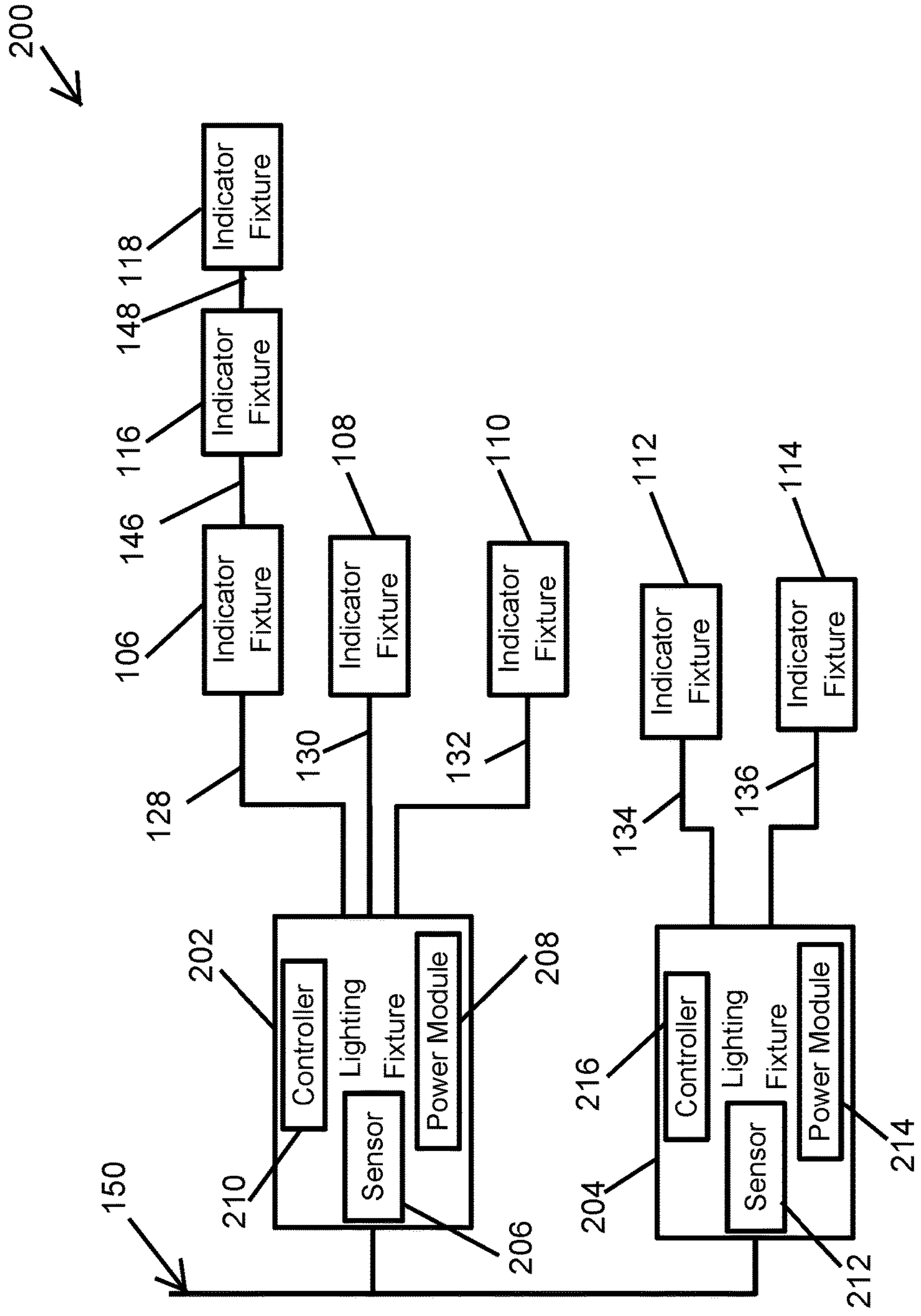
FIG. 2 is a system of parking space indicator fixtures tethered to illumination lighting fixtures according to another example embodiment.

FIG. 2 is a system 200 of the parking space indicator fixtures 106-118 tethered to illumination lighting fixtures 202, 204 according to another example embodiment. As illustrated in FIG. 2, the system 200 includes the lighting fixture 202 and the lighting fixture 204 that may be used for illumination of a parking garage or lot. The system 200 further includes the indicator fixtures 106, 108, 110, that are described above with respect to the system 100, coupled to the lighting fixture 202 by the electrical cables 128, 130, 132. The system 200 also includes the indicator fixtures 112, 114 that are described above with respect to the system 100, coupled to the lighting fixture 204 by the electrical cables 134, 136.

In some example embodiments, the lighting fixture 202 may include a sensor 206, a power module 208, and a controller 210. The sensor 206 may sense availability of one or more parking spaces in the parking garage in a similar manner as described with respect to the sensors 120, 122, 124, 126 of the system 100. For example, the sensor 206 may be the sensor 120 integrated with the lighting fixture 202. To illustrate, the sensor 206 may be a motion/occupancy sensor, a camera, an RFID reader, a magnetic sensor, etc.

The power module 208 may correspond to the power module 152 of the lighting fixture 102 of the system 100. For example, the power module 208 may generate DC power from AC or from DC power received via the connection 150. The lighting fixture 202 may provide the DC power generated by the power module 208 to the indicator fixtures 106, 108, 110, 116, 118 over the electrical cables 128, 130, 132, 146, 148. The power module 208 may also provide power to the sensor 206 over an electrical wiring of the lighting fixture 202. In some example embodiments, the power module 208 may be the driver of the lighting fixture 202 that also provides power to the LED light sources of the lighting fixture 202.

In some example embodiments, the controller 210 may generally correspond to the controller 154 of the lighting fixture 102. For example, the controller 210 may control the indicator fixtures 106, 108, 110, 116, 118 based on parking space availability information from the sensor 206 in the manner as described above with respect to the system 100 of FIG. 1. The lighting fixture 202 may also communicate with the indicator fixtures 106, 108, 110, 116, 118 over the respective electrical cables 128, 130, 132, 146, 148 or wirelessly to control the indicator fixtures to emit a particular color of light, to blink, to display text or a number indicative of available parking spaces, etc.

In some example embodiments, the lighting fixture 204 may include a sensor 212, a power module 214, and a controller 216 that operate in a similar manner as described with respect to the lighting fixture 202. To illustrate, the power module 214 may provide power (e.g., less than 60 VDC, approximately 60 VDC, and/or more than 60 VDC, etc.) to the indicator fixtures 112, 114 via the cables 134, 136. The power module 214 may also provide power to the sensor 212 and the controller 216.

In some example embodiments, the controller 210 may control the indicator fixtures 112, 114 based on parking space availability information from the sensor 212 in a similar manner as described above with respect to the controllers 158, 202. The lighting fixture 202 may also communicate with the indicator fixtures 112, 114 over the respective electrical cables 134, 136 or wirelessly to control the indicator fixtures 112, 114 to emit a particular color of light, to blink, to display text or a number indicative of available parking spaces, etc. in a similar manner as described above. In general, the controllers 210, 216 may execute respective software codes to perform some of the operations described herein with respect to the lighting fixtures 202, 204.

In some alternative embodiments, the system 200 may include more or fewer lighting fixtures and indicator fixtures than shown without departing from the scope of this disclosure. Further, in some alternative embodiments, the lighting fixtures may each include more than one sensor without departing from the scope of this disclosure. In some alternative embodiments, a sensor may be omitted from some of the lighting fixtures of the system 200, where the sensing for availability of a parking space is performed by a separate sensor as shown in FIG. 1 or by a standalone sensor. In such embodiments, a lighting fixture without the sensor may still provide power to the indicator fixtures tethered from the particular lighting fixture.

Figure 3:
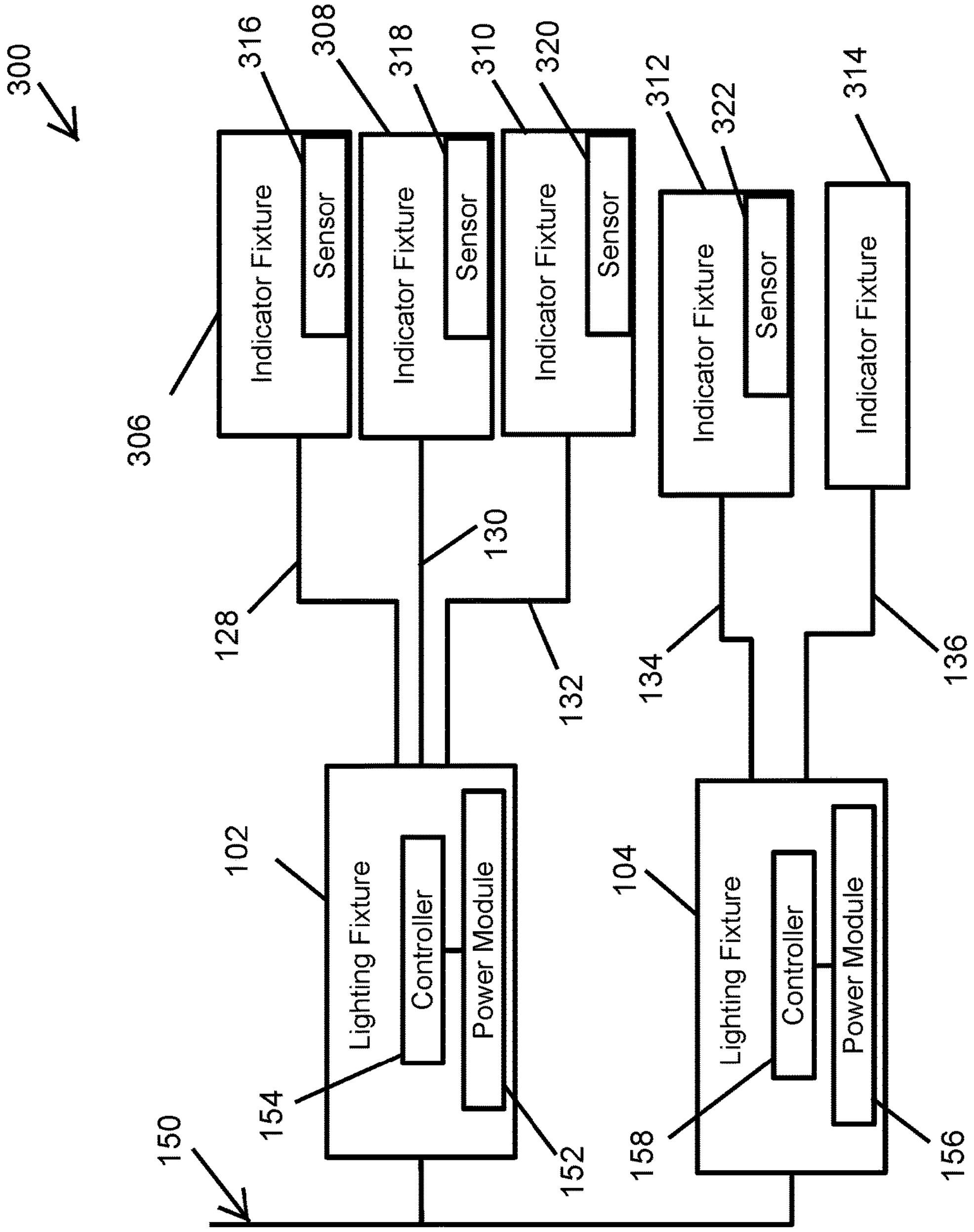
FIG. 3 is a system of parking space indicator fixtures tethered to illumination lighting fixtures according to another example embodiment.

FIG. 3 is a system 300 of parking space indicator fixtures tethered to illumination lighting fixtures 102, 104 according to another example embodiment. As illustrated in FIG. 3, the system 300 includes the lighting fixture 102 and the lighting fixture 104 described above with respect to the system 100. The system 300 may further include indicator fixtures 306, 308, 310 that are coupled to the lighting fixture 102 by electrical cables 128, 130, 132, respectively. The system 300 may also include indicator fixtures 312, 314 that are coupled to the lighting fixture 104 by electrical cables 134, 136, respectively. The lighting fixture 102 may provide power to and communicate with the indicator fixtures 306, 308, 310 over the electrical cables 128, 130, 132, and the lighting fixture 104 may provide power to and communicate with the indicator fixtures 312, 314, over the electrical cables 134, 136. The power module 152 of the lighting fixture 102 may generate output DC power from input AC or DC power as described above and provide the output DC power to the indicator fixtures 306, 308, 310 in a similar manner as described above.

In some example embodiments, the indicator fixture 306 includes a sensor 316, the indicator fixture 308 includes a sensor 318, and the indicator fixture 310 includes a sensor 320. The sensors 316, 318, 320 may each be a motion/occupancy sensor, a camera, an RFID-based sensor, a magnetic sensor, etc. that operate in a similar manner as described above with respect to the sensors 120-126 of the system 100 of FIG. 1. In some example embodiments, each sensor 316, 318, 320 may be powered by the power provided to the respective indicator fixture by the lighting fixture 102.

In some example embodiments, the controller 154 of the lighting fixture 102 may control the indicator fixtures 306, 308, 310 to indicate availability of parking spaces in a similar manner as described above. For example, the lighting fixture 102 may receive space availability information from the sensor 316 via the cable 128 or wirelessly and communicate with the indicator fixture 306 to emit a particular color of light, blink, display text or a number to indicate the availability or unavailability of parking spaces associated with the sensor 316 (i.e., parking spaces monitored by the sensor 316). The lighting fixture 102 may communicate with the indicator fixtures 306 via the cable 128 or wirelessly. The lighting fixture 102 may receive parking space availability information from the sensors 318, 320, and control the respective indicator fixtures 308, 310, in a similar manner.

In some example embodiments, the lighting fixture 104 may provide power to the indicator fixtures 312, 314 in a similar manner as described with respect to the lighting fixture 102 and the indicator fixtures 306, 308, 310 of the system 300 and the lighting fixture 104 and the indicator fixtures 112, 114 of FIG. 1. The lighting fixture 104 may also control operations of the indicator fixture 312, which includes a sensor 322, based on space availability information from the sensor 322 with respect to one or more parking spaces monitored by the sensor 322. For example, the controller 158 may communicate with the indicator fixture 312 to control the space availability indicated by the indicator fixture 312. The lighting fixture 104 may also control the indicator fixture 314, which may not include an integrated sensor, based on space availability information from the sensor 322 of the indicator fixture 312 or from another sensor.

In some alternative embodiments, the system 300 may include more or fewer lighting fixtures and indicator fixtures than shown without departing from the scope of this disclosure. Further, in some alternative embodiments, the indicator fixtures may each include more than one sensor without departing from the scope of this disclosure.

Figure 4:
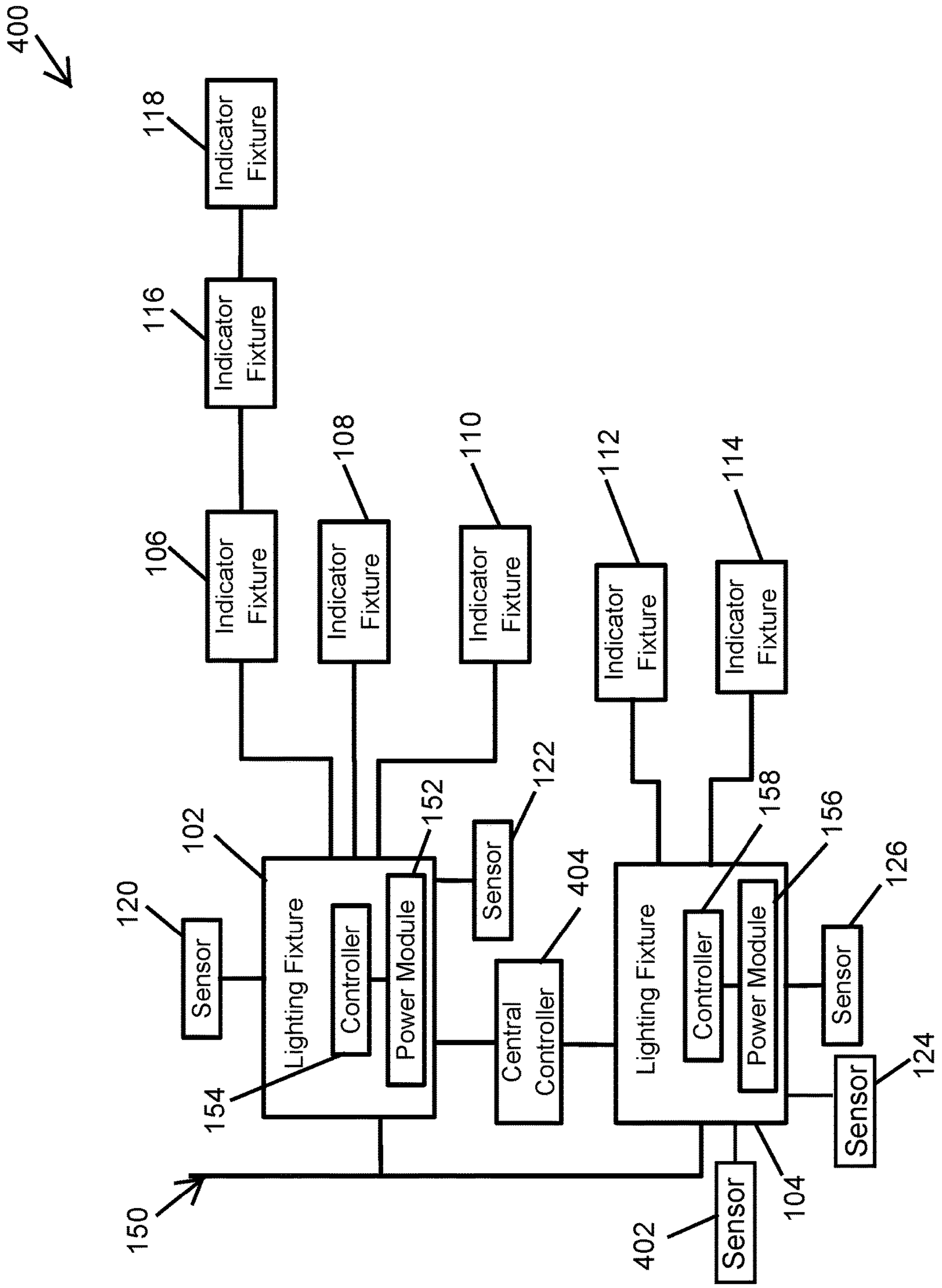
FIG. 4 is a system of parking space indicator fixtures tethered to illumination lighting fixtures according to another example embodiment.

FIG. 4 is a system 400 of parking space indicator fixtures tethered to illumination lighting fixtures according to another example embodiment. As illustrated in FIG. 4, the system 400 includes the lighting fixtures 102, 104 described above, and the indicator fixtures 106-118 that are tethered to the lighting fixtures 102, 104 in the same manner as shown in FIG. 1. The system 400 also includes the sensors 120, 122 (described with respect to FIG. 1) coupled to and powered by the lighting fixture 102, and the sensors 124, 126 (described with respect to FIG. 1) coupled to and powered by the lighting fixture 104. The system 400 also includes a sensor 402 connected to the lighting fixture 104 and that operates in a similar manner as the sensors 124, 126.

In some example embodiments, the system 400 further includes a central controller 404 that can control the operations of the indicator fixtures 106-118 of the system 400. For example, the central controller 404 may include a microcontroller or microprocessor that can execute a software code to perform some operations described with respect to the system 400. For example, space availability information from the sensors 120-126, 402 may be transmitted to the central controller 404 through the respective lighting fixtures 102, 104 that are connected to and power the sensors 120-126, 402.

To illustrate, the sensors 120-126, 402 may wirelessly or via the respective electrical cables transmit space availability information to the respective lighting fixtures 102, 104, and the lighting fixtures 102, 104 may transmit the information from the different sensors 120-126, 402 to the central controller 404 wirelessly or via wired communication. The central controller 404 may process the space availability information from the different sensors 120-126, 402 and communicate with the indicator fixtures 106-118 with or without going through the respective lighting fixtures 102, 104. In some example embodiments, the sensors 120-126, 402 may provide the space availability information to the central controller 404 without going through the respective lighting fixtures.

In some alternative embodiments, the system 400 may include more or fewer lighting fixtures and indicator fixtures than shown without departing from the scope of this disclosure. Further, in some alternative embodiments, the system 400 may include more or fewer sensors than shown without departing from the scope of this disclosure. In some example embodiments, the lighting fixtures, the indicator fixtures, and the sensors may be connected in a different configuration than shown without departing from the scope of this disclosure.

Figure 5:
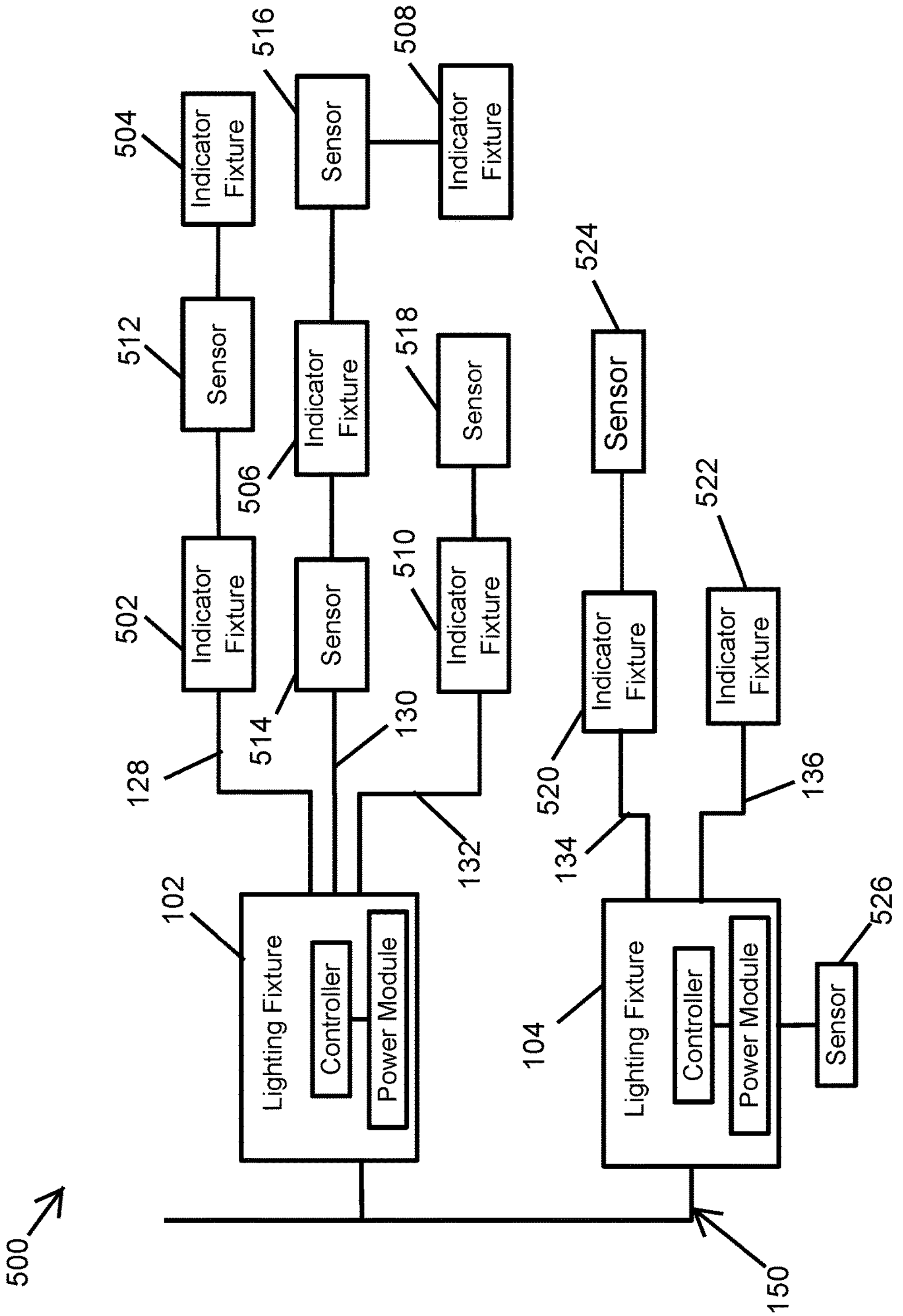
FIG. 5 is a system of parking space indicator fixtures tethered to illumination lighting fixtures according to another example embodiment.

FIG. 5 is a system 500 of parking space indicator fixtures tethered to illumination lighting fixtures 102, 104 according to another example embodiment. As illustrated in FIG. 5, the system 500 includes the lighting fixtures 102, 104 described above. The system 500 also includes indicator fixtures 502, 504, 506, 508, 510, that are powered by the lighting fixture 102. The system 500 further includes the sensors 512, 514, 516, 518, that are also powered by the lighting fixture 102. As illustrated in FIG. 5, the indicator fixture 502, the sensor 512, and the indicator fixture 504 are coupled to the lighting fixture 102 in a daisy-chain configuration. The sensor 514, the indicator fixture 506, the sensor 516, and the indicator fixture 508 are also coupled with the lighting fixture 102 in a daisy-chain configuration. The indicator fixture 510 and the sensor 518 are also daisy chained with the lighting fixture 102. The lighting fixture 102 may communicate with the indicator fixtures 502-510 and the sensors 512-518 via the cables that are used to provide electrical power to the indicator fixtures 502-510 and the sensors 512-518. Alternatively or in addition, the lighting fixture 102 may communicate with the indicator fixtures 502-510 and the sensors 512-518 wirelessly. For example, the sensor 512 may receive power from the lighting fixture 102 via electrical cables including the electrical cable 128 and send sensor information to the lighting fixture 102 or to another controller (e.g., a central controller) wirelessly.

In some example embodiments, the system 500 includes indicator fixtures 520, 522, and the sensors 524, 526, that are coupled to the lighting fixture 104. For example, the indicator fixture 520 and the sensor 524 may be daisy-chained with the lighting fixture 104 as shown in FIG. 5.

In some example embodiments, the indicator fixtures 502, 504, 506, 508, 510, 520, 522, may correspond to the indicator fixtures described above with respect to FIGS. 1-4. In some example embodiments, the sensors 512, 514, 516, 518, 524, 526, may correspond to the sensors described above with respect to FIGS. 1-4.

In some example embodiments, one or more of the sensors 512, 514, 516, 518, 524, 526 may be associated with one or more of the indicator fixtures 502, 504, 506, 508, 510, 520, 522 such that the one or more of the indicator fixtures indicate the availability of parking space based on information from one or more of the sensors. For example, the indicator fixtures 502 and 504 may blink or otherwise indicate availability/unavailability of parking space (e.g., a single parking space or multiple parking spaces) based on sensor information from the sensor 512. As another example, the indicator fixture 506 may blink or otherwise indicate the availability/unavailability of parking space based on sensor information from the sensor 514 with respect to one or more parking spaces (e.g., a row of four parking spaces) monitored by the sensor 514.

In general, the communications described above with respect to the systems 100-500 may be based on signals that are compliant with one or more communication standards such as Ethernet, Wi-Fi, Bluetooth Low energy (BLE), etc. Further, the electrical cables connecting the indicator fixtures, sensors and lighting fixtures described with respect to the systems 100-500 may be part of a distributed low voltage power (DLVP) backbone, Power over Ethernet (PoE) or other cabled-connection structures and methods that may be used for power distribution and/or communication.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A parking facility illumination and space indicator system, comprising:

a lighting fixture configured to emit an illumination light to illuminate a parking facility;

an indicator fixture coupled to the lighting fixture by a first electrical cable, the indicator fixture configured to indicate availability of one or more parking spaces in the parking facility; and a sensor coupled to the lighting fixture by a second electrical cable, the sensor configured to sense availability of the one or more parking spaces for parking, wherein the lighting fixture is configured to provide power to the indicator fixture over the first electrical cable and to the sensor over the second electrical cable, wherein the indicator fixture indicates the availability of the one or more parking spaces based on space availability information from the sensor, and wherein the lighting fixture is configured to communicate wirelessly with the indicator fixture.

2. The system of claim 1, wherein the lighting fixture comprises a power module and wherein the power module receives input power and generates the power provided to the indicator fixture and to the sensor.

3. The system of claim 2, wherein the input power is AC power and wherein the power provided to the indicator fixture and to the sensor by the lighting fixture is DC power.

4. The system of claim 2, wherein the power module is a Class 2 power source.

5. The system of claim 1, further comprising a second indicator fixture coupled to the indicator fixture by a third electrical cable, wherein the second indicator fixture is powered by the lighting fixture over the first electrical cable and the third electrical cable, wherein the lighting fixture, the indicator fixture, and the second indicator fixture are daisy-chained by the first electrical cable and the third electrical cable, and wherein the second indicator fixture indicates the availability of the one or more parking spaces based on the space availability information from the sensor.

6. The system of claim 1, wherein the lighting fixture communicates with the sensor wirelessly.

7. The system of claim 1, wherein the lighting fixture is connected to the indicator fixture and the sensor in a daisy-chain configuration.

8. The system of claim 1, wherein the lighting fixture is configured to receive the space availability information from the sensor and to control the indicator fixture based on the space availability information to indicate the availability of the one or more parking spaces for parking.

9. The system of claim 8, wherein the lighting fixture comprises a controller configured to control the indicator fixture based on the space availability information from the sensor.

10. The system of claim 1, further comprising a central controller configured to control the indicator fixture based on the space availability information from the sensor.

11. A parking facility illumination and space indicator system, comprising:

a lighting fixture configured to emit a light to illuminate a parking facility, wherein the lighting fixture comprises a sensor configured to sense availability of one or more parking spaces;

a first indicator fixture to indicate the availability of the one or more parking spaces in the parking facility based on space availability information from the sensor, wherein the first indicator fixture is coupled to the lighting fixture by a first electrical cable and wherein the lighting fixture provides power to and communicates with the first indicator fixture over the first electrical cable; and a second indicator fixture coupled to the first indicator fixture by a second electrical cable, wherein the second indicator fixture is powered by the lighting fixture over the first electrical cable and the second electrical cable, wherein the lighting fixture, the first indicator fixture, and the second indicator fixture are daisy-chained by the first electrical cable and the second electrical cable, and wherein the second indicator fixture indicates the availability of the one or more parking spaces based on the space availability information from the sensor.

12. The system of claim 11, wherein the lighting fixture receives an input power and generates the power provided to the indicator fixture and to the sensor from the input power and wherein the input power is AC power and wherein the power provided to the indicator fixture and to the sensor by the lighting fixture is DC power.

13. The system of claim 11, wherein the lighting fixture is configured to receive the space availability information from the sensor and to control the first indicator fixture based on the space availability information to indicate the availability of the one or more parking spaces for parking.

14. The system of claim 11, further comprising a third indicator fixture coupled to the lighting fixture by a third electrical cable, wherein the third indicator fixture is powered by the lighting fixture over the third electrical cable and wherein the third indicator fixture indicates the availability of the one or more parking spaces based on the space availability information from the sensor.

15. A parking facility illumination and space indicator system, comprising:

a lighting fixture configured to emit a light to illuminate a parking facility;

a first indicator fixture comprising a sensor configured to sense availability of one or more parking spaces, the first indicator fixture configured to indicate the availability of the one or more parking spaces based on space availability information from the sensor, wherein the first indicator fixture is coupled to the lighting fixture by a first electrical cable and wherein the lighting fixture provides power to and communicates with the first indicator fixture including the sensor over the first electrical cable; and a second indicator fixture coupled to the first indicator fixture by a second electrical cable, wherein the second indicator fixture is powered by the lighting fixture over the first electrical cable and the second electrical cable, wherein the lighting fixture, the first indicator fixture, and the second indicator fixture are daisy-chained by the first electrical cable and the second electrical cable, and wherein the second indicator fixture indicates the availability of the one or more parking spaces based on the space availability information from the sensor.

16. The system of claim 15, wherein the lighting fixture receives an input power and generates the power provided to the indicator fixture from the input power and wherein the input power is AC power and wherein the power provided to the first indicator fixture and to the sensor by the lighting fixture is DC power.

17. The system of claim 15, wherein the lighting fixture is configured to receive the space availability information from the sensor over the electrical cable and to control the first indicator fixture based on the space availability information to indicate the availability of the one or more parking spaces for parking.

18. The system of claim 15, further comprising a third indicator fixture coupled to the lighting fixture by a third electrical cable, wherein the third indicator fixture is powered by the lighting fixture over the third electrical cable and wherein the third indicator fixture indicates the availability of the one or more parking spaces based on the space availability information from the sensor.

19. The system of claim 1, wherein the lighting fixture comprises a controller that controls operations of the lighting fixture and the indicator fixture.

20. The system of claim 11, wherein the first electrical cable is an Ethernet cable.

* * * * *